(12) United States Patent
Ito et al.

(10) Patent No.: US 7,461,288 B2
(45) Date of Patent: Dec. 2, 2008

(54) COMPUTER APPARATUS AND PROCESS CONTROLLING METHOD

(75) Inventors: Tomoyuki Ito, Kanagawa (JP); Shinichi Takemura, Kanagawa (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 11/034,193

(22) Filed: Jan. 12, 2005

(65) Prior Publication Data
US 2006/0036650 A1 Feb. 16, 2006

(30) Foreign Application Priority Data
Jan. 13, 2004 (JP) ............................. 2004-006130

(51) Int. Cl.
*G06F 11/00* (2006.01)

(52) U.S. Cl. .................. 714/4; 714/38; 714/47

(58) Field of Classification Search ..................... 714/4, 714/47, 38; 726/22
See application file for complete search history.

(56) References Cited

U.S. PATENT DOCUMENTS

| 6,615,366 | B1 * | 9/2003 | Grochowski et al. | .......... 714/10 |
| 6,640,313 | B1 * | 10/2003 | Quach | .......... 714/10 |
| 6,772,368 | B2 * | 8/2004 | Dhong et al. | .......... 714/11 |

FOREIGN PATENT DOCUMENTS

| JP | 4 238536 | 8/1992 |
| JP | 2002 353960 | 12/2002 |

* cited by examiner

*Primary Examiner*—Bryce P. Bonzo
*Assistant Examiner*—Charles Ehne
(74) *Attorney, Agent, or Firm*—Frommer Lawrence & Haug LLP; William S. Frommer; Thomas F. Presson

(57) ABSTRACT

A process state judging unit judges whether the state of the process is in the state that at least the integrity is held or not. A process executing unit executes the process based on the judged result by the process state judging unit. A reliability judging unit judges the reliability of program or data read in a main memory in response to the process state judged by the process state judging unit.

16 Claims, 19 Drawing Sheets

COMPUTER APPARATUS AND PROCESS CONTROLLING METHOD

BACKGROUND OF THE INVENTION

1. Field of the Invention

The present invention relates to a computer apparatus and a process controlling method, and more particularly to a computer apparatus in which an operating system such as Linux, etc. manages execution of a program by a process and executes the program and a process controlling method.

This application claims priority of Japanese Patent Application No. 2004-006130, filed on Jan. 13, 2004, the entirety of which is incorporated by reference herein.

2. Description of the Related Art

For example, a basic software (operating system: OS), such as Unix for a personal computer PC-Unix (Registered Trademark), etc., represented by Linux, FreeBSD manages the execution of a program by a process and executes the program in the computer apparatus. Even in an electronic device equipped with a personal digital assistant (PDA), or a CPU such as a digital camera device, a digital video device, etc., the OS similarly manages and executes the execution of a program by a process.

Heretofore, the above-mentioned OS has executed process state management only regarding a process of an execution state, an executable state, a temporary pause, etc. Further, checking of integrity of an execution file or a library is performed by a tool for periodically checking the integrity such as Tripwire or for checking the integrity of the entire execution file immediately before the execution. An encryption of a file is executed in a file unit.

An applicant of the present invention discloses a technology for performing a memory protection when an access to an incorrect address area occurs in an operating system without decelerating an execution processing speed by Pat. Document (WO00/34871).

The conventional OS performs a status management regarding the processing of a process only about processing of the above-mentioned execution state, the executable state, the temporary pause, etc., and regarding whether the integrity of the process is held or not or whether important data decoded from the important execution file encrypted to prevent an analysis by a third party is held or not has not been grasped at all.

Therefore, even in the process in which a process to access to important data is falsified, the OS allows to access to the data since the process cannot be identified from a normal process. Even in the process to be executed is the falsified process, if the processing is correct, this process can be executed.

The process consists of an execution file and various libraries. Therefore, even if all the linked libraries are checked by a signature, etc. and the integrity of the libraries are held, unless the execution file has signature and the integrity is guaranteed, the process cannot be guaranteed to be correct with no falsification. Even if the integrity of one execution file is performed, if the integrity of the other library is not held, the integrity is not held as the entire process. It is considered to use a tool for checking whether the signature is attached only to the execution file to confirm the integrity, but since the process moves as one as a whole, if any one of the execution file, the libraries is not held at the integrity, the integrity as the process cannot be guaranteed.

However, it is not practical to sign all the execution files and the libraries in view of an overhead and management, and only the necessary file must be signed.

Thus, in the case of process control and management of only the process, which process is executed by what reliability cannot be grasped, and hence access control to important data or the like cannot be performed at the OS side.

In checking the integrity of the execution file or the library, if periodical integrity is checked at each one week or each one month, the integrity can be guaranteed immediately after the end of the checking, but it cannot be confirmed whether the integrity is held or not until the next integrity check is completed.

If the integrity is checked immediately before the execution, when the execution file or the library of large size is checked, since the files are all read in a memory, a large quantity of memory is consumed to delay starting. Therefore, a frequently used library has relatively large size, and it is not practical to check the entire file at each starting time. Further, since the checking is performed only at the starting time, the checking during execution is not performed. Therefore, the integrity if the process is falsified during execution is not held.

It is necessary to decode and execute the execution file encrypted before the execution in the encryption of the file to be executed in a file unit irrespective of the data file, but since the encryption is performed in a file unit, the decryption must be performed after the entire file is once read in the memory. Therefore, in the case of the file having the large size, the large quantity of the memory is consumed similarly to the checking of the integrity, and hence the starting is delayed.

Furthermore, in the above-mentioned Pat. Document, the technology for protecting the memory when access to an incorrect address area occurs is disclosed but does not disclose a process control, that is an object of the present invention, for managing the processing state of the process, checking the integrity of the file of the program intended to be executed by the execution file or protecting data to be decoded from the encrypted data.

SUMMARY OF THE INVENTION

The present invention has been made in view of the above-mentioned circumstances and has an object of providing a computer apparatus and a process controlling method which prevents execution of an incorrect process or a falsified process by changing the process according to the state of the reliability of the process by adding and managing the state, such as a state for handling the state for checking not only the process but the integrity, or data to be protected in a process state of an OS and which can improve reliability.

The computer apparatus according to the present invention manages the execution of a program by an operating system in a process unit in order to solve the above-mentioned problem and comprises a process state judging means for judging whether the state of the process is at least held in integrity (the state that the integrity is guaranteed) or not, and a process executing means for executing the process based on the judged result by the process state judging means.

The process state judging means judges whether the process is in the state that at least integrity is guaranteed or not, and the process executing means executes the process based on the judged result by the process state judging means.

A process controlling method according to the present invention manages the execution of a program in a process unit in order to solve the above-mentioned problem, and comprises a process state judging step of judging whether the process is in the state that at least (the state that the integrity is guaranteed) and a process executing step of executing the process based on the judged result by the above-mentioned process state judging step.

The process state judging step judges whether the process is in the state that at least the integrity is guaranteed or not, and the process executing step executes the process based on the judged result by the process state judging step.

Since in a computer apparatus according to the present invention, the process state judging means judges whether the process is in the state that at least the integrity is held (state that the integrity is guaranteed) or not and the process executing means executes the process based on the judged result by the process state judging means, the OS becomes capable of judging whether the process is correct or not by managing the state of the process, and can prevent the access control to important data, and the execution of an incorrect program and a falsified program, which can improve the reliability.

The checking or the decoding of the integrity of data is executed in a process unit. Thus, the starting time of a program is shortened as compared with the case of checking the entire file, and the memory can be saved. Further, since the integrity is checked immediately before the process, the security is raised from the conventional art. Further, only part of the bare minimum of data can be decoded.

Since in the process controlling method according to the present invention, the process state judging step judges whether the process is in the state that at least the integrity is held (guaranteed) or not and the process executing step executes the process based on the judged result by the process state judging step, the OS becomes capable of judging whether the process is correct or not by managing the state of the process, and can prevent the access control to important data, and the execution of an incorrect program and a falsified program, which can improve the reliability.

The checking or the decoding of the integrity of data is executed in a process unit. Thus, the starting time of a program is shortened as compared with the case of checking the entire file, and the memory can be saved. Further, since the integrity is checked immediately before the process, the security is raised from the conventional art. Further, only part of the bare minimum of data can be decoded.

DETAILED DESCRIPTION OF THE PREFERRED EMBODIMENTS

Figure 1:
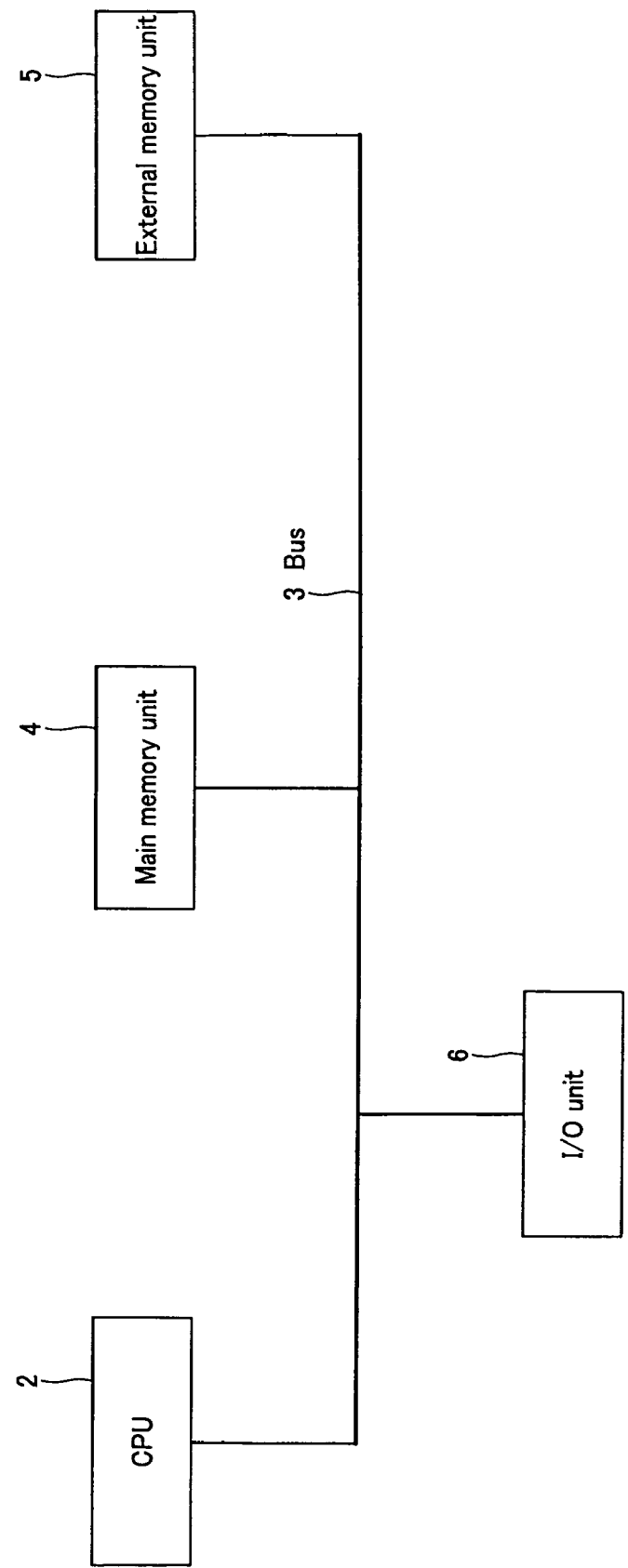
FIG. 1 is a view of a hardware configuration of a computer apparatus.

An embodiment of the present invention will be described below with reference to the accompanying drawings. This embodiment is a computer apparatus 1 showing a hardware configuration in FIG. 1. This computer apparatus 1 includes a central processing unit (CPU) 2 constructed as a center, and a main memory 4, an external memory 5 and I/O unit 6 connected to the CPU 2 through a bus 3. The CPU 2 is operated with Linux as basic software (Operating System: OS). The CPU 2 reads data necessary for the OS from the external memory 5 such as an HDD, in the main memory 4, such as a RAM, etc., and executes the program.

The external memory 5 stores the program of the OS to be executed by the CPU 2. The program retrieved from the external memory 5 by the CPU 2 is stored in the main memory 4. The CPU 2 manages and executes the program read in the main memory 4 in a process unit.

As an input unit of the I/O unit 6, there are a keyboard and a mouse connected to an input unit interface. An input signal from the keyboard or the mouse is transferred to the CPU 2 from the input unit interface through the bus 3. As an output unit of the I/O unit 6, there is a display unit connected to a display controller. The display controller generates a display image according to a drawing instruction sent from the CPU 2, and sends the display image to the display unit. The display unit displays the image on a screen according to display image information sent from the display controller.

Figure 2:
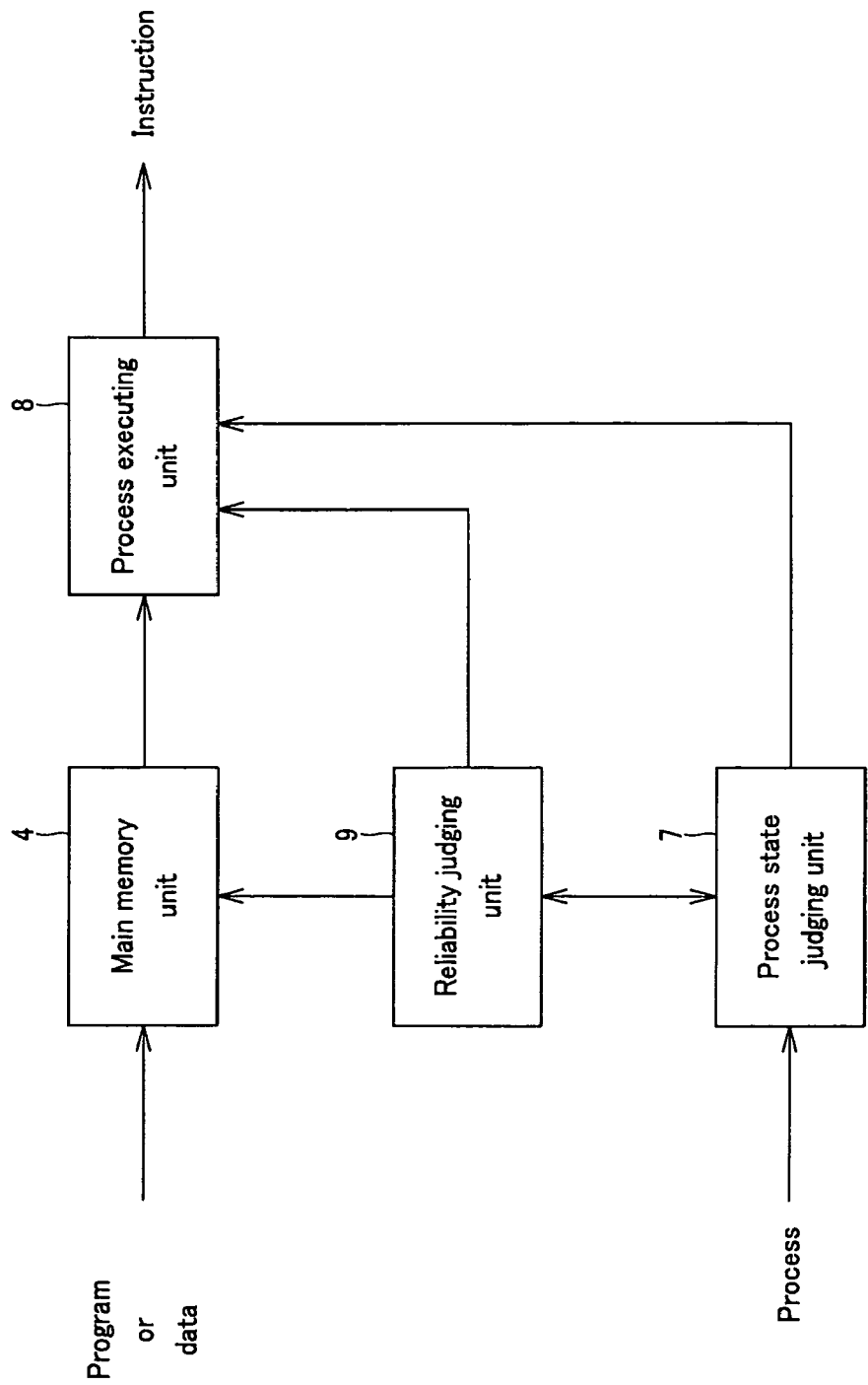
FIG. 2 is a functional block diagram of the computer apparatus.

The computer apparatus 1 executes the OS to which the process controlling method of the present invention is applied by the CPU 2, and thereby functions as shown in FIG. 2. That is, the computer apparatus 1 includes a process state judging unit 7 for judging whether the process is in the state that at least the integrity is held or not, and a process executing unit 8 for executing the process based on the judged result by the process state judging unit 7. The computer apparatus 1 includes a reliability judging unit 9 for judging the reliability of a program or data read in the main memory 4 in response to the process state judged by the process state judging unit 7.

The process state judging unit 7 judges three states of which the process is in the state that only the integrity is held, which the integrity is held and important data necessary to be protected is handled, and which the integrity is not guaranteed (normal state). There are only the cases of judging the two states of which the process is in the state that the integrity is held and which the integrity is not guaranteed (normal state). There are also the cases of judging the two states of which the process is in the state that only the integrity is held and which the integrity is held and important data requiring protection is handled.

The process executing unit 8 executes an Exec( ) process, a Dynamic_link( ) process, a Decrypt( ) process, a Trusted_To_Normal( ) process, a Critical_To_Trusted( ) process, a Trusted_To_Critical( ) process, a Page_Fault( ) process, an Exit( ) process, etc. to be described later based on the judged result by the process state judging unit 7 to the program or the data read in the main memory.

The reliability judging unit 9 judges the reliability of the program or the data read in the main memory 4 in response to the process state judged by the process state judging unit 7. This judged result is sent to the process executing unit 8. The process executing unit 8 executes the process based on the judged result by the reliability judging unit 9. The reliability judging unit 9 checks the integrity of the program or the data read in the main memory 4 dynamically after during the execution like the dynamic link, the demand paging, etc. to be described later. The integrity of the execution file or library of the process read in the main memory 4 is also checked.

The computer apparatus 1 functionally judges the above-mentioned state by the process state judging unit 7 by executing the OS to which the process controlling method of the present invention is applied by the CPU 2, and executes the process by the process executing unit 8 based on the judged result of the process state judging unit 7, and thereby preventing the execution of the falsified process or the incorrect process, which can improve the reliability.

Further, when the process is executed by the process executing unit 8, all the files are not always read in the memory like the main memory 4, but only the part becoming necessary for the process is read in the memory. A reading unit is a fixed length of a certain size. Therefore, by checking the integrity in a reading unit by the reliability judging unit 9, all the files are not checked at the starting time, but the integrity of the processing in the process can be held. Even if the file is falsified during the processing, the falsification can be detected during the processing.

Heretofore, it was necessary to execute the execution file encrypted before the execution after decoding the execution file in the encryption of the file executed in a file unit irrespective of the execution file and the data file, but the process executing unit 8 executes the decoding of the encrypted data read in the main memory 4 in reading unit similarly to the checking of the integrity, and thereby executes the decoding only for a necessary part.

The operation of the computer apparatus 1 will be described in detail. First, the execution of a normal program in Linux will be described.

Figure 3:
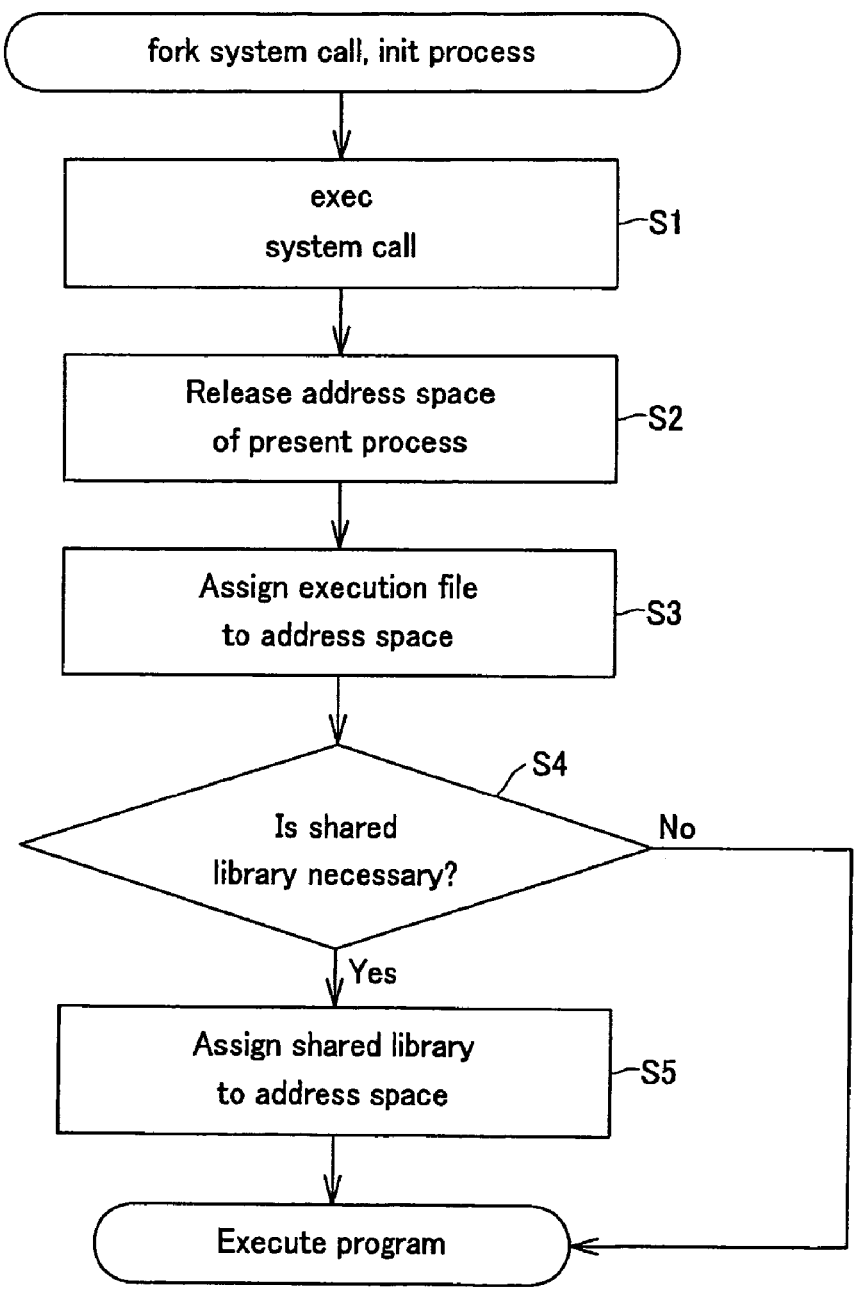
FIG. 3 is a flowchart showing a processing sequence of an execution starting program in Linux.

The execution of the program in Linux is operated in a process unit according to the sequence of the process shown in FIG. 3. S1 to S5 of FIG. 3 are symbols showing the corresponding steps. Regarding branching, if YES in the process of step S1, (S1: YES) is expressed.

A fork system call exists in Linux. The present process is duplicated by calling this. There is also an exec system call, which releases the resources of the present process to acquire the resources necessary to start the execution of the program on order to execute the program. In the flow of the start of the execution of the program, the program is duplicated in the fork system call, and thereafter, the exec system call is issued by the duplicated process to acquire the resources necessary to execute the program, and to execute the program. Regarding the starting time, since there is no process, a process called an init process is generated by another method.

In order to start the execution of the program, first the exec system call is called (step S1). Then, the resources of an address space and the like of the present process are released (step S2). The execution file to be executed is assigned to the address space (step S3). If there is a shared library necessary for the execution (step S4: YES) before the execution of the program is started, the shared library is assigned to the address space (step S5), and the program is executed. Since the process of assigning the shared library is dynamically executed, the assignment is processed not only at the starting time but also at the time point of becoming necessary even during the executing of the program. If there is no necessary shared library (step S4: NO), the process is directly executed.

Figure 4:
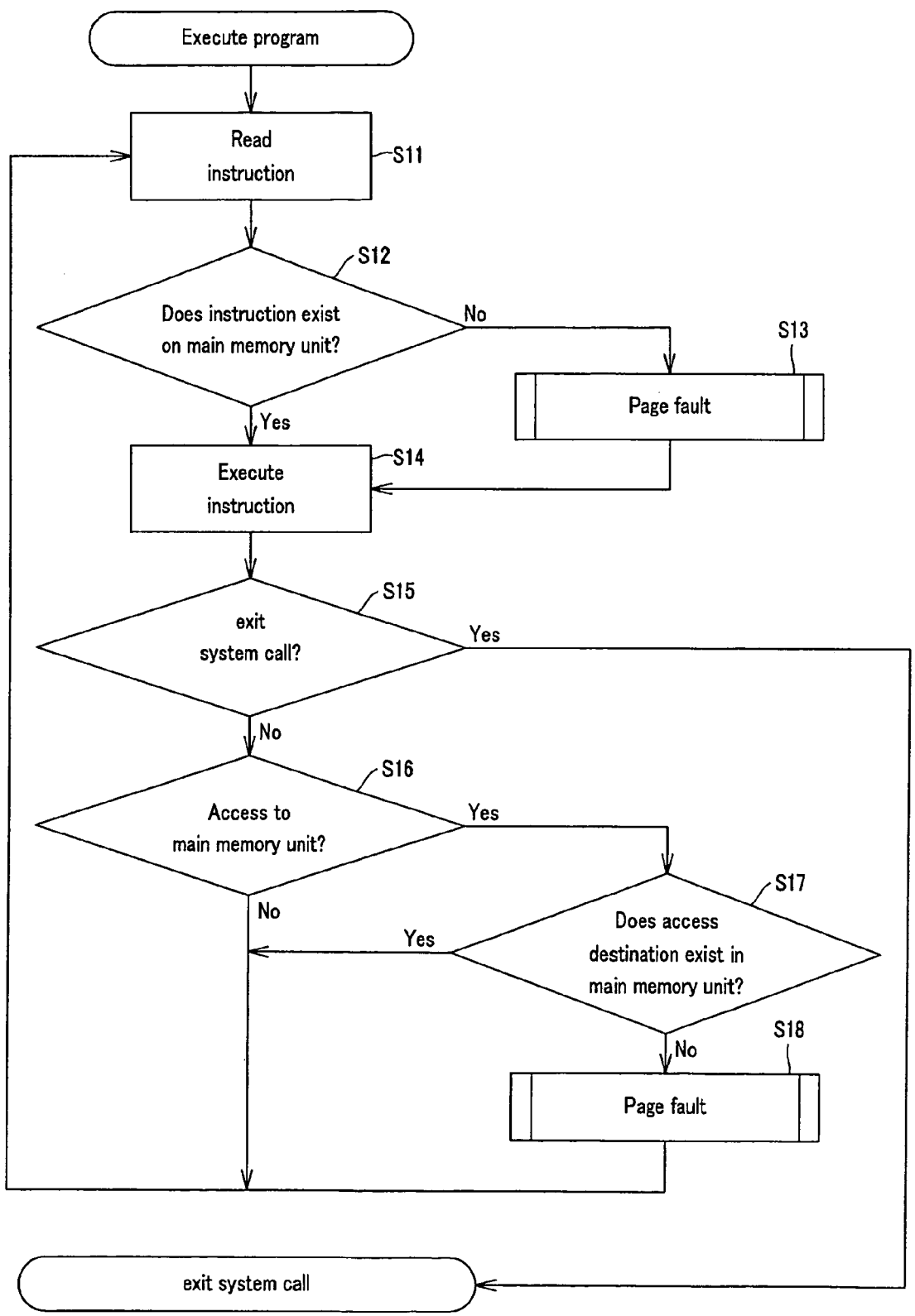
FIG. 4 is a flowchart showing a processing sequence of an execution program in Linux.

The execution of the program is fundamentally the repeating of the reading of instruction and the execution of the instruction. The operation will be described according to the sequence of the processing shown in FIG. 4. First, reading of the instruction is executed (step S11). Whether the instruction exists in the main memory or not is checked (step S12). If not existed (step S12: NO), a page fault exception is generated, and the process is transferred to a page fault exception handler (step S13).

The page fault will be described. If No in step S12 and an access destination does not exist in the main memory 4, a page fault exception is generated, the page fault exception handler is called, and data is loaded in a page unit in the main memory from an external memory. The process for loading thus needed page is called demand paging. The size loaded in the main memory is loaded in a data unit of fixed length called page. For example, in the most cases of Linux, it is 4 kbyte (4096 byte) unit. Necessary data is read in the main memory by the page fault, and when the reading of the instruction is ended, the execution of the instruction is performed (step S14).

In step S15, whether the instruction is the exit system call or not is checked. If the instruction is the exit system call (step S15: YES), to finish the process, the exit system call is called. If it is not the exit system call (step S15: NO), the instruction is executed. However, since it accesses to the data or the like according to the instruction, it might access to the address space (step S16). If it accesses (step S16: YES), the instruction is executed in the assumption that the access destination exists in the mail memory (step S17: YES). If the access destination does not exist in the main memory, a page fault execution is generated (step S18), and necessary data is read in the main memory. When the execution of the instruction is finished, the process is returned to reading of the next instruction (step S11). As described above, the execution of the normal program in Linux has been described.

On the contrary, in the computer apparatus 1 of this embodiment, three states of the normal state (the state that the integrity is not guaranteed), the state that the integrity is held (the state that the integrity is guaranteed) and the state that the integrity is held and important data necessary to be protected is handled, are added to the process. The important data necessary to be protected is important data that must not leak externally such as the case that the encrypted execution file is decoded and the like.

The respective states are judged by the process state judging unit 7 of FIG. 2, and the process executing unit 8 changes the process state according to the judged result, and executes the process. Here, to the process state to be judged, three states of normal that shows the normal state in which the integrity is not guaranteed, trusted that shows the state that the integrity is held, and critical that shows the state that important data like decoded data in which the integrity is held and protection is needed, are added.

In summary, the description is as below. The normal displays the normal state. This is the same state as a common process to be executed in Linux.

To the processes of the trusted state and the critical state, a privilege of a special operation is given by utilizing the mechanism of the capability of Linux. The mechanism of the capability is a mechanism for giving the power of executing the operation with the specific privilege to the process. That is, here, the privilege to be given to the processes of the trusted and critical states is called a trusted capability. Hereinafter, regarding the process of a route passing only the process states of the trusted and the critical processes in a flowchart, the privilege of the trusted capability is required. If intended to process in the case that there is no privilege, an error displaying no privilege is returned and the process is terminated.

The trusted is the state that the privilege of the trusted capability is given. Also, the trusted displays the state that the signatures of the execution file and the library and a hash are checked, displaying the state that the integrity is held.

The critical displays the state that the encrypted execution file is decoded and executed in addition to the state that the signatures of the execution file and the library and a hash are checked, and integrity is held, similarly to the trusted state. It is also the state that the privilege of the trusted capability is given.

Then, the checking of the integrity to be executed by the reliability judging unit 9 and the decoding of the encrypted data to be executed by the process executing unit 8 will be described.

The reliability judging unit 9 checks the integrity of data by the digest. The digest is a hash value. The integrity of the digest is checked by the signature.

Figure 5:
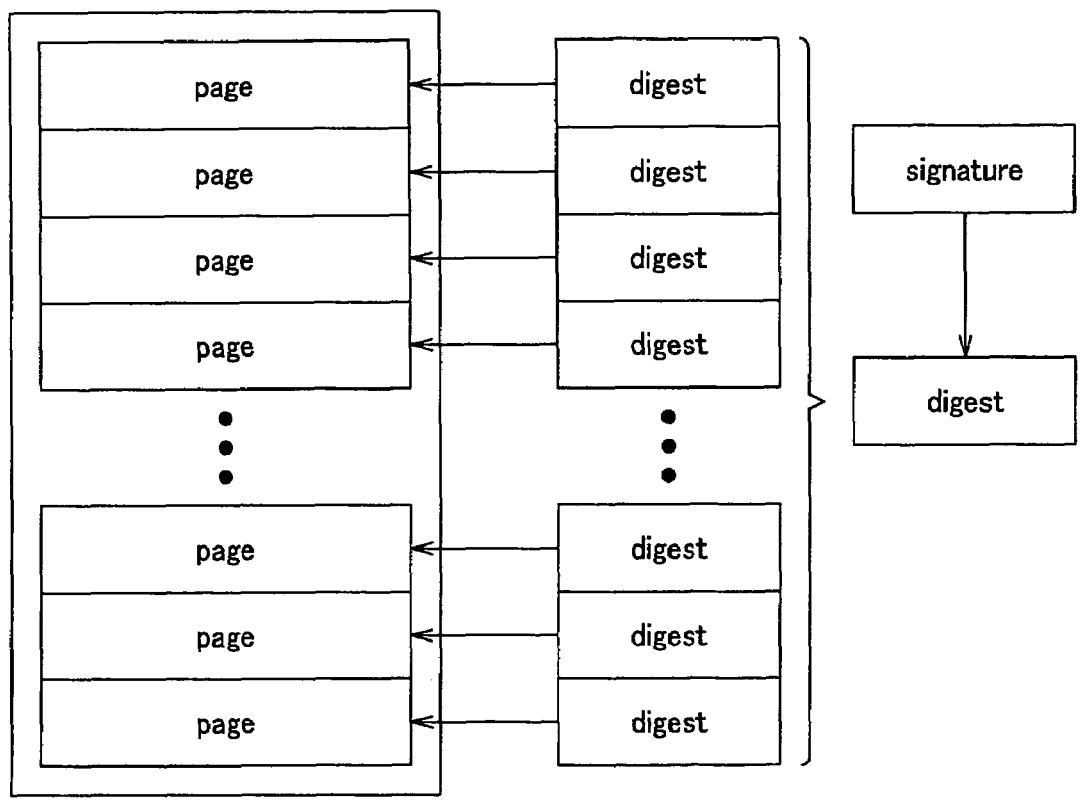
FIG. 5 is a view for explaining a process for checking a page by a digest.

The unit checked by the digest is used as a page unit as shown in FIG. 5, and a page fault exception is generated. When the page is read in the main memory, the integrity is checked for this page. The page fault is generated by the page fault exception that transfers if the instruction does not exist in the main memory after checking whether the instruction exists in the main memory or not as described above. The page fault is processed by the page fault exception handler.

Figure 6:
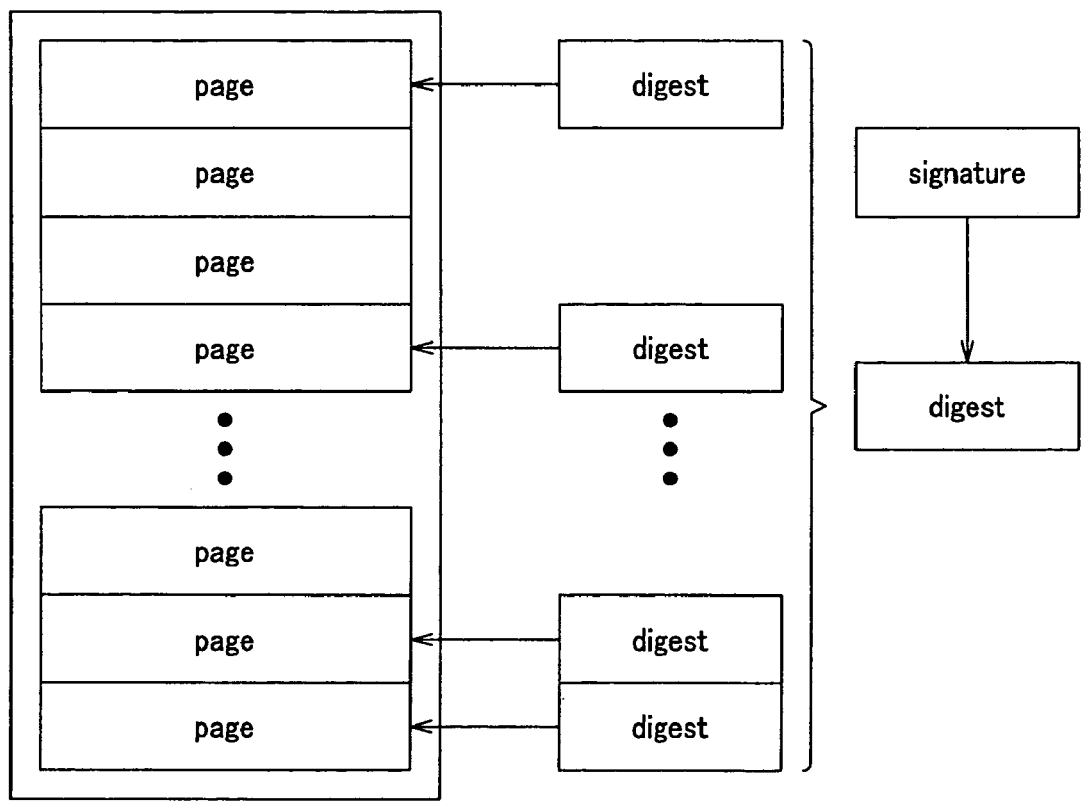
FIG. 6 is a view for explaining a process for checking only partial pages by the digest.
Figure 7:
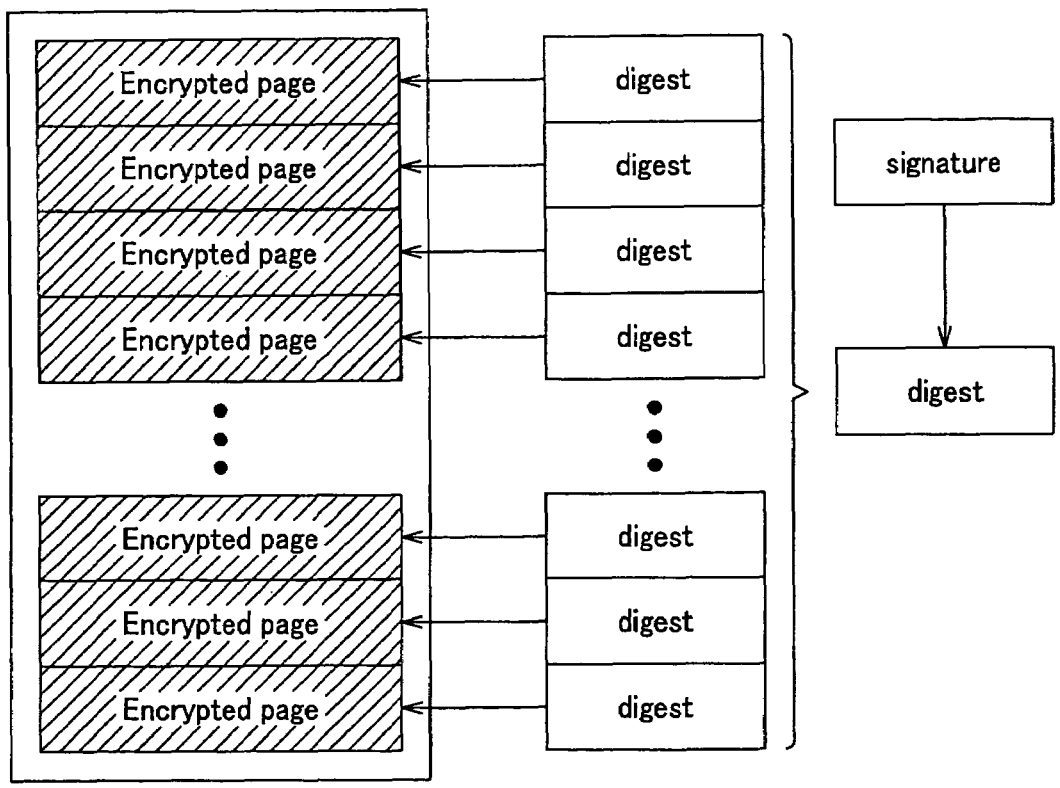
FIG. 7 is a view for explaining a process for checking an encrypted page by the digest.
Figure 8:
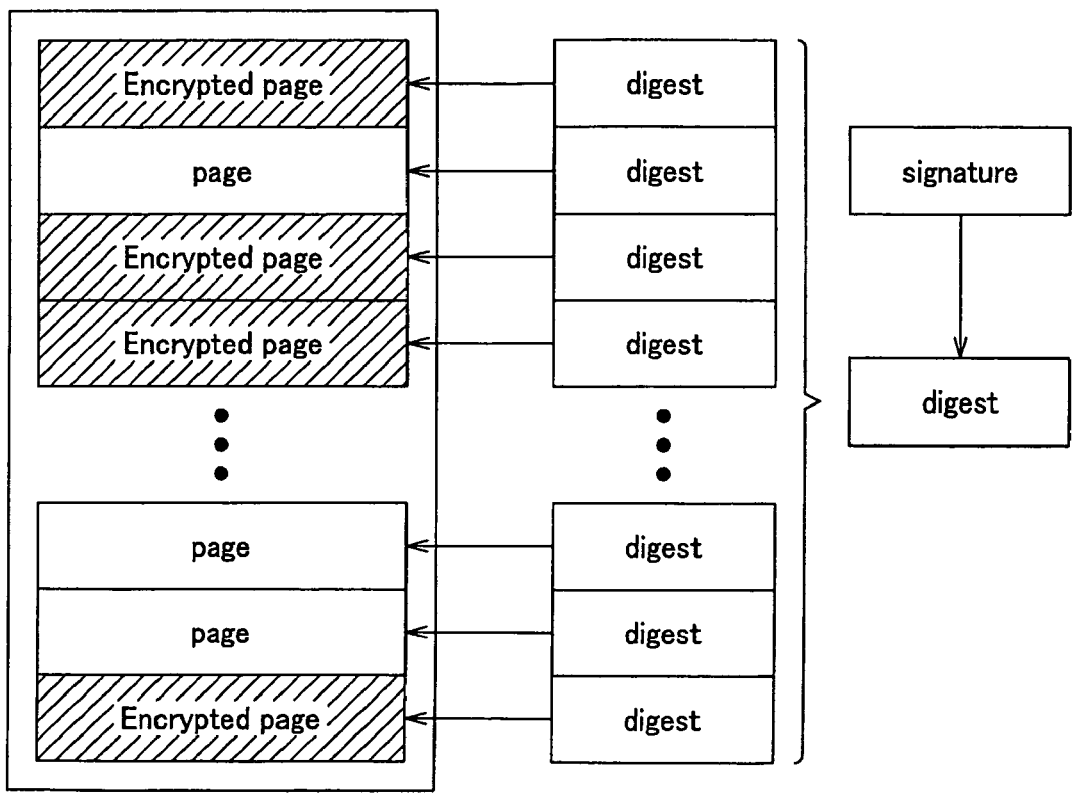
FIG. 8 is a view for explaining a process for checking only partial encrypted pages and a page by the digest.

Alternatively, the integrity may be checked by the digest only for the partial pages as shown in FIG. 6. The integrity of the digest is checked by the signature. After checking the integrity by the digest, when the encrypted unit is used as a page unit as shown in FIG. 7 and the page fault exception is generated to read the pages in the memory, the checking of the integrity and the decoding by the process executing unit 8 can be made executed. Further, free combination can be performed, such that the integrity is checked by encryption or the digest only for the partial pages as shown in FIG. 8.

Subsequently, back to the functional block diagram of FIG. 2, the cooperation of the general operation by the respective functional blocks will be described based on the state transition view of FIG. 9. The process executing unit 8 executes the following process. The Exec( ) is a process of add the process such as signature checking, etc. to the exec system call. The Dynamic_link( ) is a process of adding the process of signature check, etc. to a process when a shared library is linked. The Decrypt( ) is a process of decoding the encrypted page. The Trusted_to_Normal( ) is a process of converting the process state from the trusted to the normal. The Critical_To_Trusted( ) is a process for converting the process state from the critical to the trusted. The Trusted_To_Critical( ) is a process of converting the process state from the trusted to the critical. The Page_fault( ) is a process of adding the process of comparing of a hash value of the page to the process at the page fault time. The Exit( ) adds the process before calling the exit system call.

Figure 9:
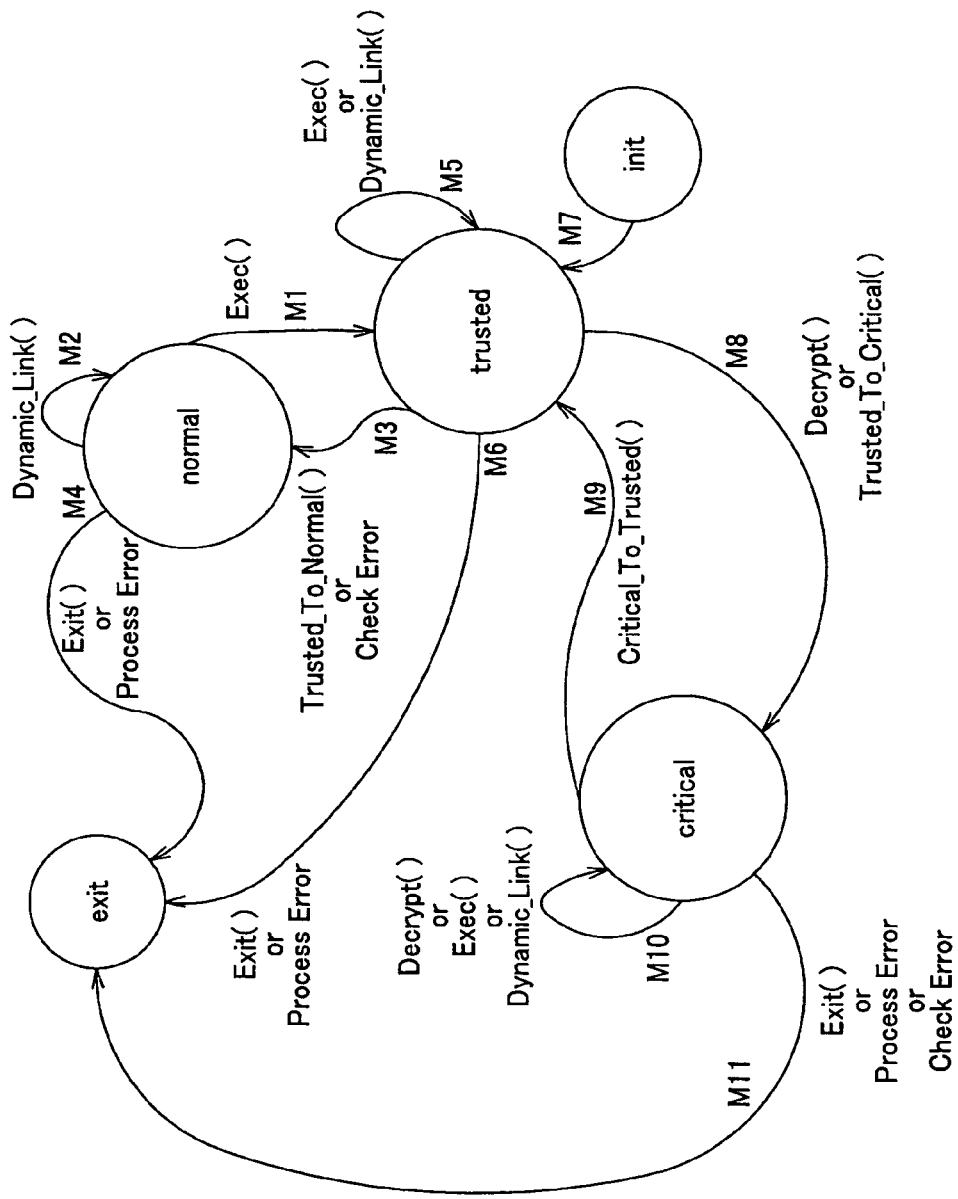
FIG. 9 is a state transition view.

In the state transition view of FIG. 9, the normal, the trusted, and the critical respectively display the process states of the normal, the trusted and the critical. The init displays an init process, the exit displays the end of the process. The Exec( ), the Dynamic-Link( ), etc. display a process for executing a transition as described above. The Process Error and the Check Error respectively display the error when checking of the error and the signature brought about by the respective process states are mistaken. M1 to M11 display state transitions.

In the state transition view of FIG. 9, the process state can be transferred from the normal only to the trusted and the exit. The process state is transferred from the normal to the trusted by calling of the exec( )(M1). By the calling of the Dynamic-Link( ), the process state does not change (M2). By the calling of the Exit( ), the process state is transferred to the exit (M4). If the error of the process state is generated, the process state is transferred to the exit. The error of this case is an error when a process that cannot be called in the normal state like the Critical_To_Trusted, etc. is intended to be performed.

In the above-mentioned state transition view, the state transition of the process state from the trusted is the normal, critical and exit. The transition to the normal state does not become the state that the integrity is held when the Trusted_To_Normal( ) is called and transferred and when the error (Check Error) is generated in the inspection of the signature. Therefore, the process state is transferred to the normal (M3). If the Exec( ) or the Dynamic_link( ) is called in the trusted state, the process state is not transferred (M5). The transition from the trusted to the critical is executed when the Decrypt( ) or the Trusted_to_Critical( ) is called (M8).

In the above-mentioned state transition view, the transition of the process state from the critical is the trusted or exit. The transition to the trusted is when the Critical_to_Trusted( ) is called (M9). When the Exec( ), the Dynamic-link( ) or the Decrypt( ) is called, the process state is not transferred (M10). When the Exit( ) is called, the process state is transferred to the exit (M11). The critical state is the case that the important data, etc., are held. If occurrence of any error or the integrity is not held, since the process state must be immediately ended, the process state is also transferred to the exit when the error of Process Error or Check Error is generated.

Figure 10:
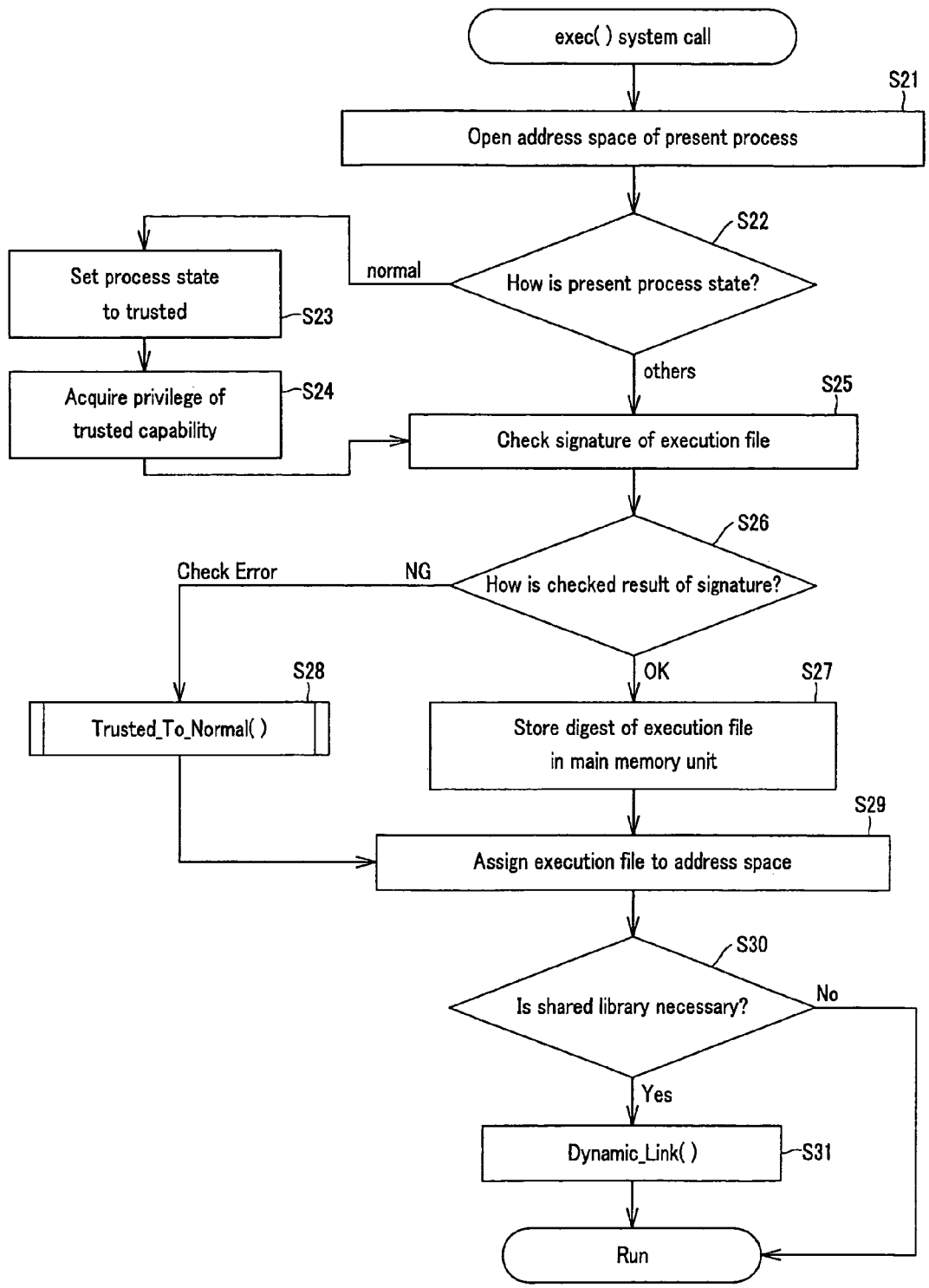
FIG. 10 is a flowchart showing the sequence of an Exec( ) process.

The state transition when the above-mentioned process is called will be described in detail. First, the Exec( ) will be described. This is the addition of the process, such as a signature check, etc., to the process of starting the execution of the program shown in FIG. 3. The operation will be described with reference to the flowchart of FIG. 10.

First, a process is duplicated by the fork system call, etc. Then, the state of the process succeeds the original process state at that time. Therefore, the process of the critical is duplicated from the critical process state. As to the init process, the process is created from the trusted state.

In step S21, the exec system call is called, and the address space of the present process is opened. Before the execution file is assigned to the address space, in step S22, the process state judging unit 7 confirms the present process state. If the process state is normal (step S22: normal), in step S23, the process state is set to trusted, and in step S23, the privilege of the trusted capability is given to the process. After the process state is confirmed, the reliability judging unit 9 checks the signature of the execution file (step S15). The result that the signature is checked is judged in step S26, and if the signature is correct (step S26: YES), the process is transferred to step S27. In step S27, the reliability judging unit 9 stores the digest of the execution file in the main memory 4. If the reliability judging unit 9 judges that the signature is not correct in step S26, that is, judges that it is a Check Error (step S26: NG), the reliability judging unit 9 transfers the process to step S28, and calls Trusted_To_Normal( ). If there is no signature, the reliability judging unit 9 judges that the signature is not correct.

After the checking of the signature is finished, in step S29, the process executing unit 8 assigns the execution file to the address space. In step S30, whether the shared library is necessary or not is judged. If the shared library is necessary (step S30: YES), in step S31, the Dynamic_Link( ) is called, and the shared library is assigned to the address space. The process executing unit 8 executes the program. In step S30, if it is judged that the shared library is not necessary (step S30: NO), the program is executed as it is.

Figure 11:
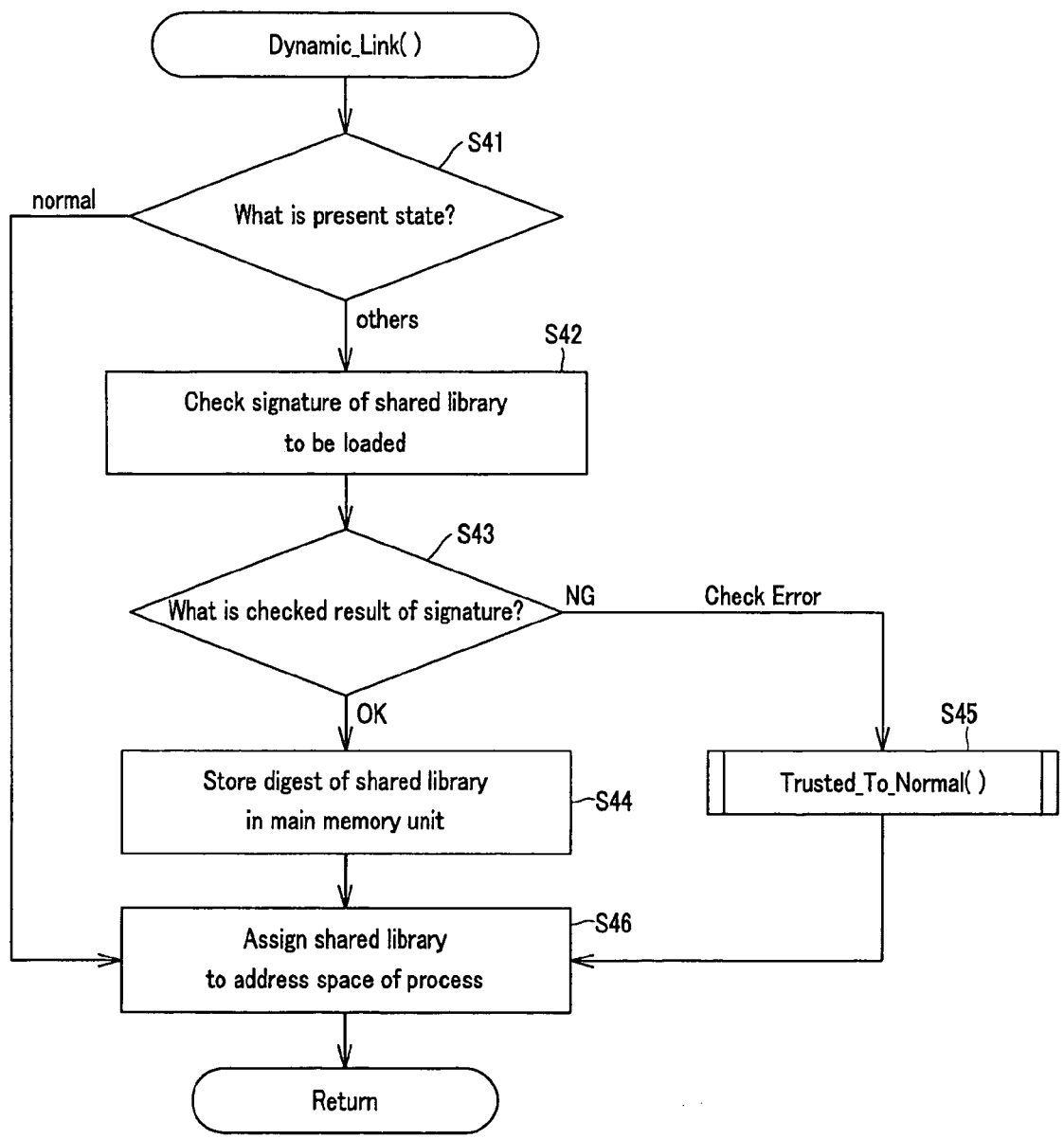
FIG. 11 is a flowchart showing the sequence of a Dynamic_link( ) process.

Then, the Dynamic_link( ) will be described. Since it is necessary to check the signature, etc. of the shared library even when the shared library is assigned to the address space, the process of the signature check is added. The operation will be described with reference to the flowchart of FIG. 11.

In step S41, the process state judging unit 7 confirms the present process state. If the process state is judged to be normal (step S41: Normal), the process is transferred to step S46, and the process executing unit 8 assigns the shared library to the address space. In step S41, if the process state judging unit 7 judges that the process state is except the normal (step S46: Other), the process is transferred to step S42, and the reliability judging unit 9 checks the signature of the loaded shared library. The reliability judging unit 9 judges the checked result of the signature in step S43. If the signature is judged to be not correct and is Check Error (step S43: NG), the process executing unit 8 calls the Trusted_To_Normal( ) in step S45, transfers the process to normal, and then assign the shared library to the address space of the process in step S46. If the signature does not exist, it is judged that the signature is not correct. If the reliability judging unit 9 judges that the signature is correct in step S43 (step S43: OK), the process is transferred to step S44, and the process executing unit 8 stores the digest of the shared library in the main memory 4. The process executing unit 8 assigns the shared library to the address space of the process in step S46.

Figure 12:
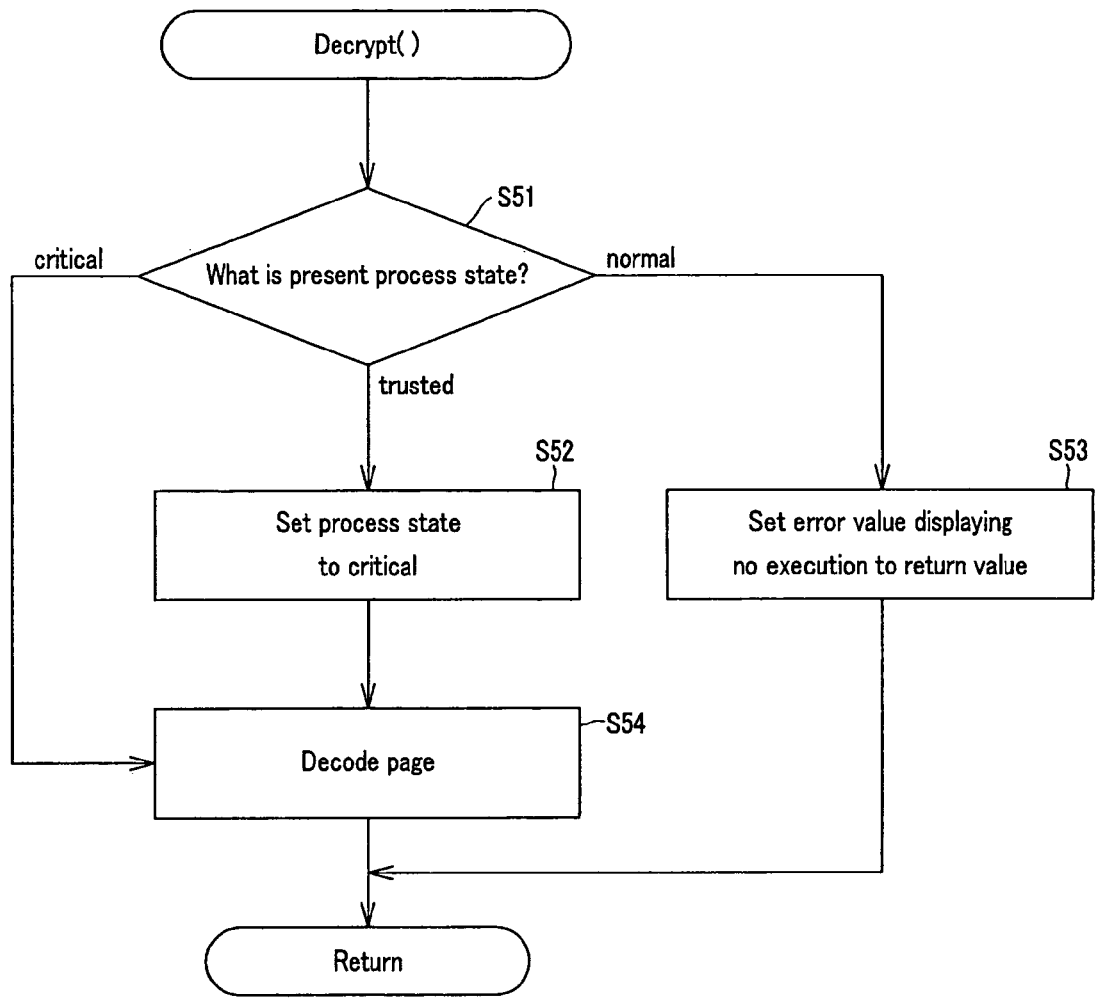
FIG. 12 is a flowchart showing the sequence of a Decrypt( ) process.

Then, the Decrypt( ) process will be described. This is the addition of the process for decoding the encrypted page. The operation will be described with reference to the flowchart of FIG. 12.

The process state judging unit 7 confirms the present process state in step S51. If the present process state is critical (step S51: Critical), the process is transferred to step S54, and the process executing unit 8 decodes the page to be returned. If the process state judging unit 7 judges that the process state is trusted in step S51 (step S51: Trusted) the process is transferred to step S52, and the process executing unit 8 sets the process state to critical, and then decodes the page in step S54 to be returned. If the process state judging unit 7 judges that the process state is normal in step S51 (step S51: Normal), the process is transferred to step S53, and the process executing unit 8 sets an error value displaying that the execution cannot be performed to a return value to be returned.

Figure 13:
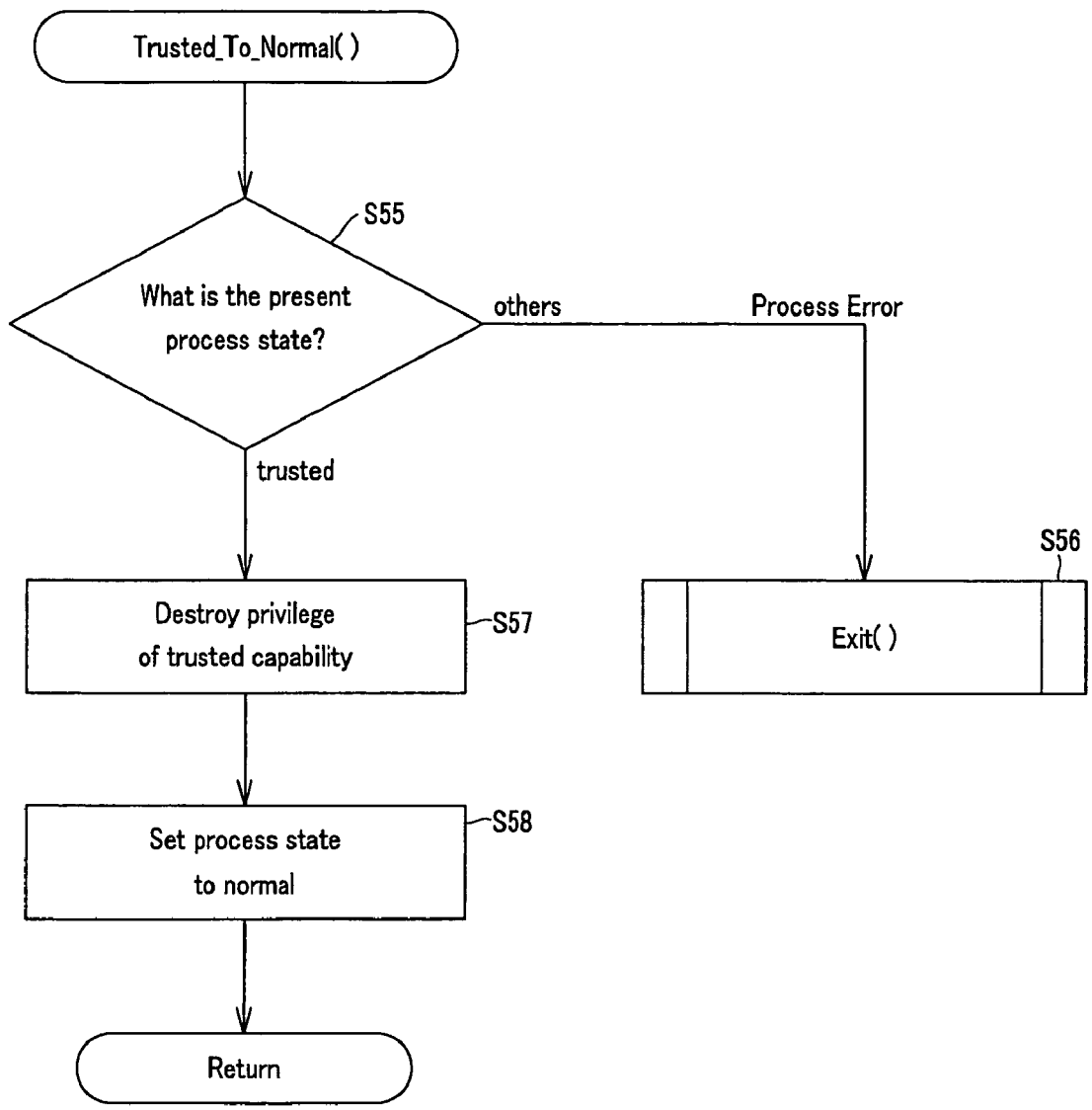
FIG. 13 is a flowchart showing the sequence of a Trusted_To_Normal( ) process.

Then, the Trusted_To_Normal( ) process will be described. This is an additional process for setting the process state from the trusted to the normal. The operation will be described with reference to the flowchart of FIG. 13.

First, the process state judging unit 7 confirms the present process state in step S55. If the process is judged to be not the trusted but the other state (step S55: Other), the reliability judging unit 9 judges that it is a process error, and calls the Exit( ) of step S56. If the process state judging unit 7 judges that the process state is trusted in step S55 (step S55: Trusted), the process is transferred to step S57. The process executing unit 8 destroys the privilege of the trusted capability, then transfers to step S58, sets the process state to normal, and returns.

Figure 14:
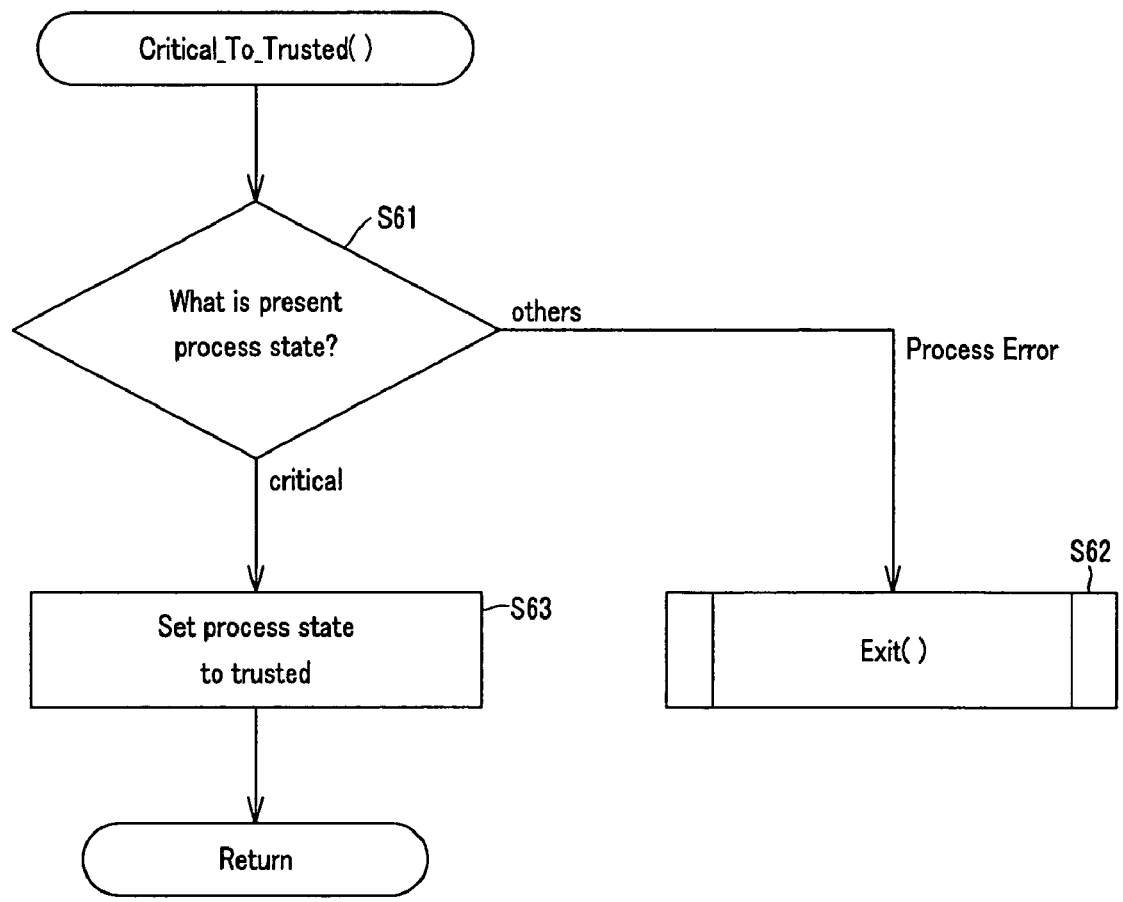
FIG. 14 is a flowchart showing the sequence of a Critical_To_Trusted( ) process.

Then, the Critical_To_Trusted( ) process will be described. This is a process added to set the process state from the critical to the trusted. The operation will be described with reference to the flowchart of FIG. 14.

First, the process state judging unit 7 confirms the present process state in step S61. If the process is judged to be not the critical but is the other state (step S61: Other), the reliability judging unit 9 judges it is a process error, and the process executing unit 8 calls the Exit( ) of step S62. If the process state is critical in step S61 of the process state judging unit 7 (step S61: Critical), the process state is transferred to step S63, and the process executing unit 8 sets the process state to the trusted, and returns.

The Critical_To_Trusted( ) is an instruction for explicitly changing the process state from the critical to the trusted. The data, such as the decoded data held in the critical state is on the premise of erasing by the program itself with responsibility.

Figure 15:
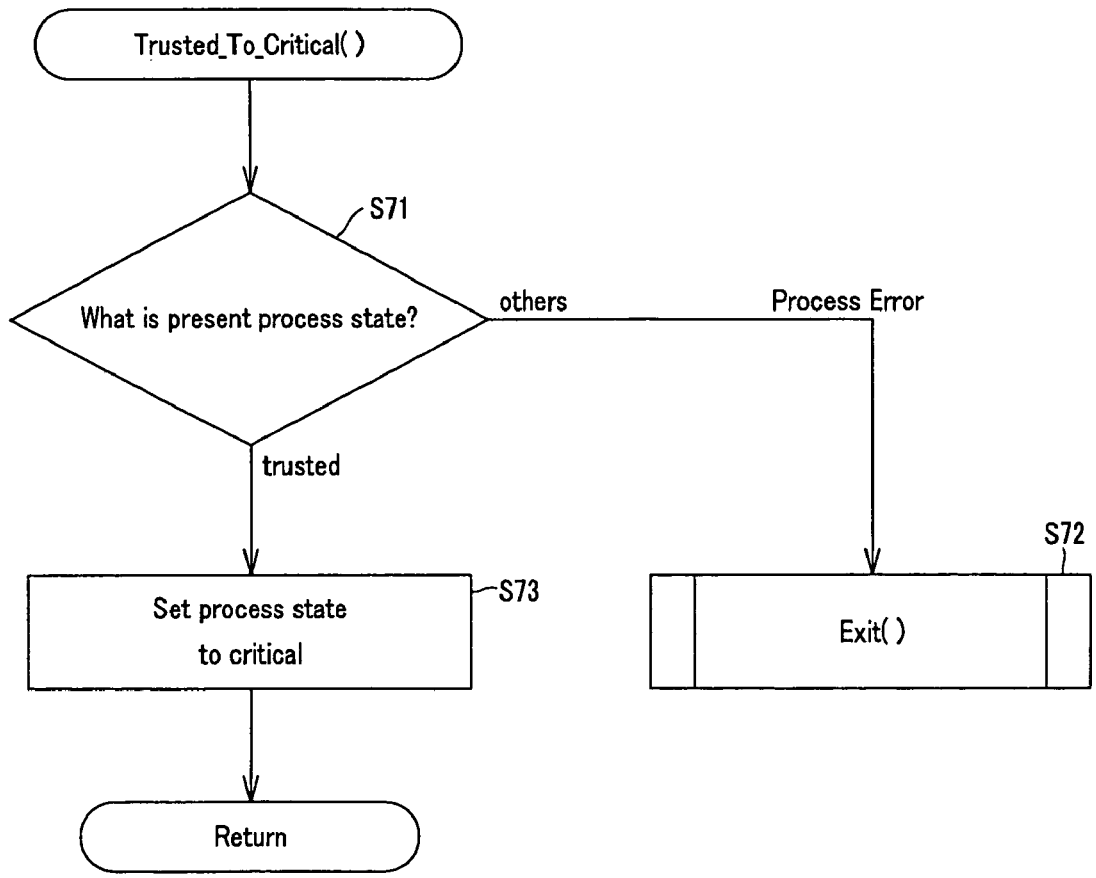
FIG. 15 is a flowchart showing the sequence of a Trusted_To_Critical( ) process.

Then, the Trusted_To_Critical( ) process will be described. This is a process added to set the process state from the critical to the trusted. The operation will be described with reference to the flowchart of FIG. 15.

First, the process state judging unit 7 confirms the present process state in step S71. If the process is judged to be not the trusted but the other state (step S71: Other), the reliability judging unit 9 judges it is a process error, and the process executing unit 8 calls the Exit( ) of step S72. If the process state is trusted in step S71 (step S71: Trusted), the process state is transferred to step S73, is set to the critical, and returned.

Then, the Page_Fault( ) process will be described. If the page fault exception is generated, the page fault exception handler is called, and the necessary page is read from the external memory 5 to the main memory 4. Since the checking of the integrity and the decoding are executed for the read page, its process is added.

Figure 16:
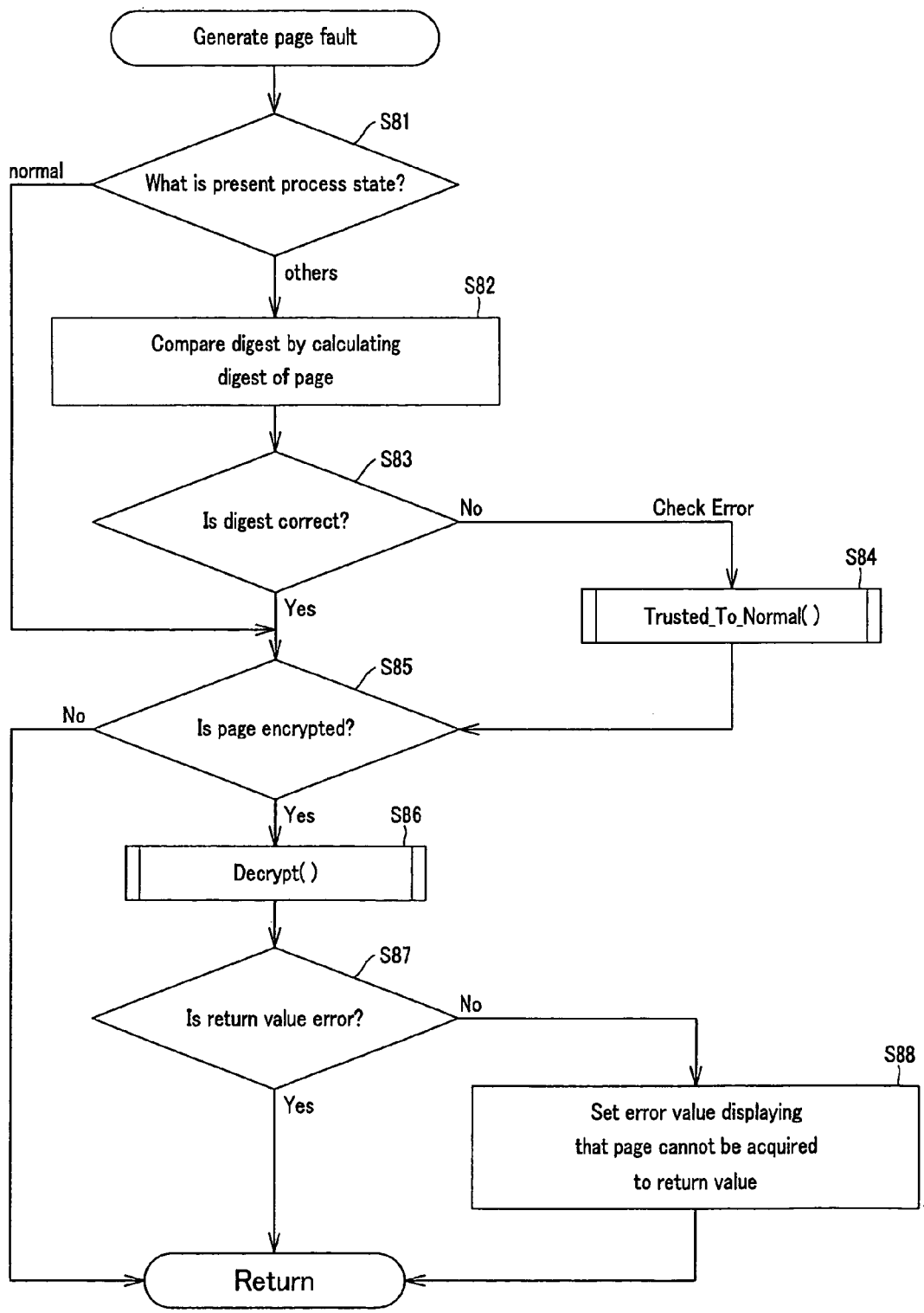
FIG. 16 is a flowchart showing the sequence of a Page_Fault( ) process.

The operation will be described with reference to the flowchart of FIG. 16. First, the process state judging unit 7 confirms the state of the process generating the exception (step S81) after the page fault exception is generated. If the process state is normal (step S81: Normal), since this is the page not necessary to be checked, the comparison of the digest of step S82 is not executed. If the present process state is not normal in step S81 but the other state (step S81: Other), the reliability judging unit 9 calculates the digest of the page in step S82, and checks the digest. As the result that the reliability judging unit 9 checks the digest, if it is judged that the digest is not correct in step S83 (step S83: NO), Check Error is set, and the process executing unit 8 calls the Trusted_To_Normal of step S84. If the reliability judging unit 9 judges that the result of the digest is correct in step S83 (step S83: YES), the process state is transferred to step S85, and whether the page is encrypted or not is checked. The process executing unit 8 returns if the reliability judging unit 9 judges that the page is not encrypted in step S85 (step S85:NO). If it is judged that the page is encrypted in step S85, the process state is transferred to step S86, and the Descript ( ) is called. The reliability judging unit 9 judges in step S87 whether the return value is error or not for the Decrypt( ) of step S86. If the value of the error is returned in step S87 (step S87: YES), since it means that the encrypted data cannot be accessed, the process state is transferred to step S88, the process executing unit 8 sets the error displaying that the page cannot be acquired, and returns. If the reliability judging unit 9 judges it is not an error in step S87 (step S87: NO), the process executing unit 8 returns.

Then, the Exit( ) process will be described. When the process is finished, the exit system call is called, but a process for erasing the data of the process from the main memory in the case of the critical state immediately before calling the exit system call is added.

Figure 17:
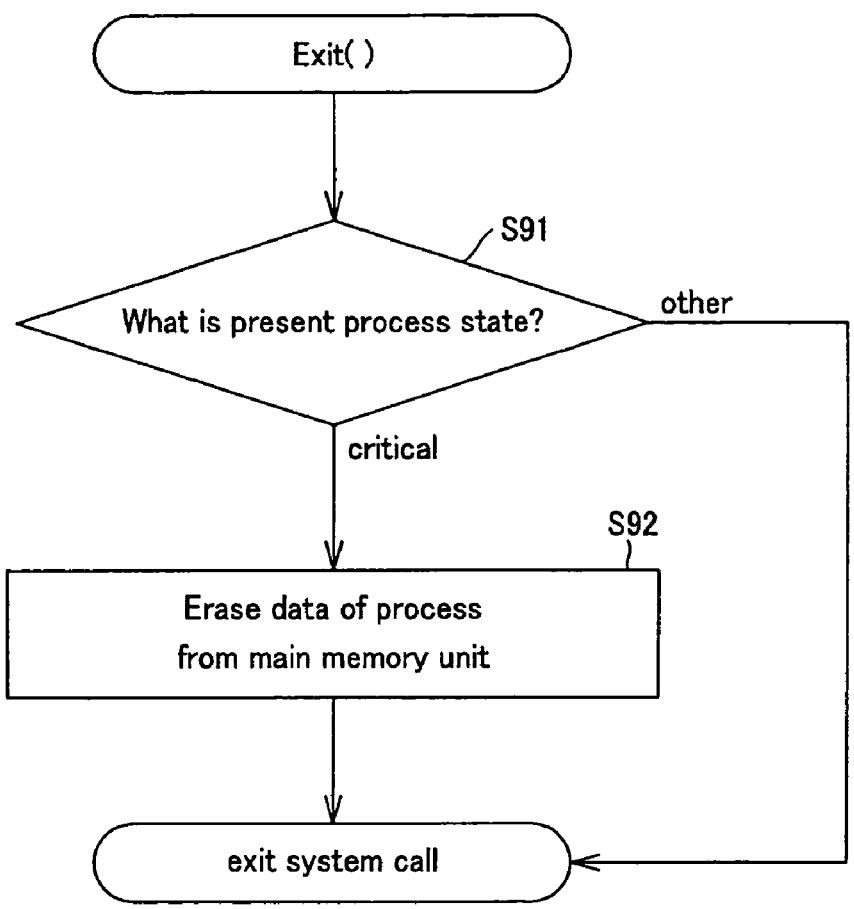
FIG. 17 is a flowchart showing the sequence of an Exit( ) process.

The operation will be described with reference to the flowchart of FIG. 17. First, the process state judging unit 7 confirms the present process state in step S91. If it is judged that the process is not critical but in other state (step S91: Other), the process executing unit 8 calls the exit system call, and finishes the process. If the process state is judged to be critical in step S91 (step S91: Critical), since the important data such as the decoded page, etc. is retained in the main memory, the process executing unit 8 erases all the information of the process from the main memory in step S92, and then the exit system call is called, and the process is finished.

Figure 18:
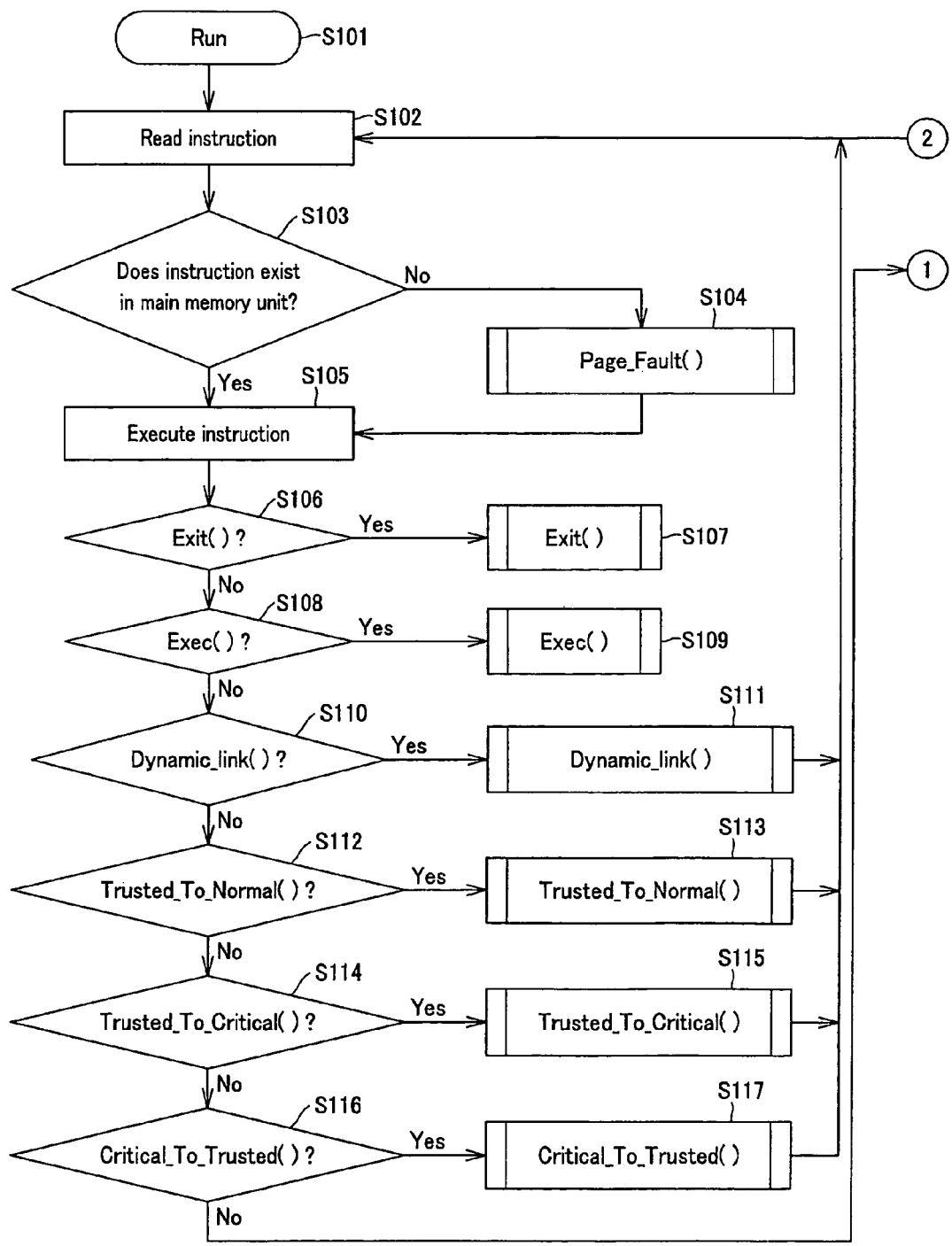
FIG. 18 is a flowchart showing the sequence of an execution process a program.
Figure 19:
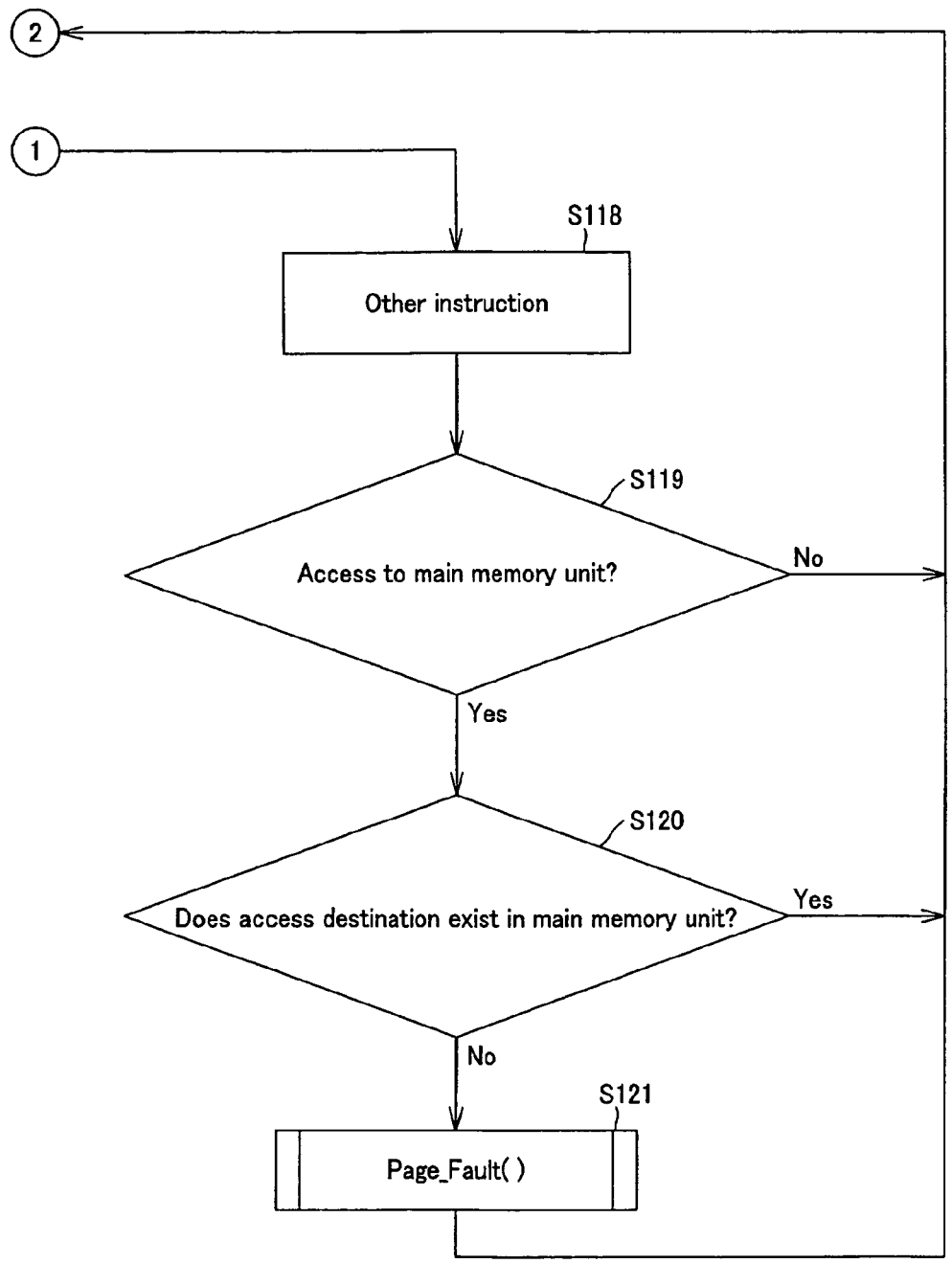
FIG. 19 is a flowchart showing the sequence of an execution process of the program.

Then, an executing process of the program as a series of the flow will be described with reference to the flowcharts of FIG. 18 and FIG. 19. When the Exec( ) is called and the preparation of the execution of the program is arranged, the execution of the program is started (step S101). First, the instruction is read in step S102, and the execution of the program is started. The computer apparatus 1 judges whether the instruction exists in the main memory or not in step S103, and if not (step S103: NO), the process state is transferred to step S104, the check of the page is executed by the Page_Fault( ), and then the process state is transferred to the execution of the instruction in step S105. If it is judged that the instruction exists in the main memory in step S103 (step S103: YES), the instruction is executed in step S105 and the following, but is executed after the instruction is confirmed in steps S106, S108, S110, S112, S114 and S116.

The process executing unit 8 judges whether executing instruction is the Exit( ) or not in step S106. If it is the Exit( ) (step S106:YES), the process state is transferred to step S107, the Exit( ) is called, and the process is finished. If it is judged that the instruction executed in step S106 is not the Exit( ) (step S106: NO), and further, the instruction is judged to be the Exec( ) (step S108: YES) as a result that whether the instruction is Exec( ) or not is judged in step S108, the process is transferred to step S109, the Exec( ) is called, the suitable state is set to the process, and the execution of the program is started.

If the instruction is judged to be not Exec( ) in step S108 (step S108: NO) and it is judged to be the Dynamic_Link( ) (step S110:YES) as a result that whether the instruction is the Dynamic_Link( ) or not is judged in step S110, the process is transferred to step S111, the Dynamic-Link( ) is called, the process is set to a suitable state, and the shared library is assigned to the address space. After the calling, the process is transferred to step S102, and next instruction is read.

If the instruction is judged to be not the Dynamic-Link( ) in step S110 (step S110:NO) and it is judged to be the Trusted_To_Normal( ) (step S112:YES) as a result that whether the instruction is Trusted_To_Normal( ) or not is judged in step S112, the process is transferred to step S113, the Trusted_To_Normal( ) is called, and the process state is set from the trusted to the normal. After the process, the process state is transferred to step S102, and reading of the next instruction is executed.

If the instruction is judged to be not the Trusted_To_Normal( ) in step S112 (step S112: NO) and it is judged to be the Trusted_To_Critical (step S114:YES) as a result that whether the instruction is the Trusted_To_Critical( ) or not is judged in step S114, the process is transferred to step S115, the Trusted_To_Critical( ) is called, and the process state is set from the trusted to the critical. After the calling, the process is transferred to step S102, and the next instruction is read.

If the instruction is not the Trusted_To_Critical( ) in step S114 (step S114:NO), and further, it is judged that the instruction is the Critical_To_Trusted( ) (step S116:YES) as a result that whether the instruction is the Critical_To_Trusted( ) or not is judged in step S116, the Critical_To_Trusted( ) is called, and the process state is set from the critical to the trusted. After the calling, the process is transferred to step S102 and the next instruction is read.

If the instruction is judged to be not the Critical_To_Trusted( ) in step S116, that is, in the case that the instruction is not any of the Exec( ), the Dynamic_Link( ), the Trusted_To_Normal( ), the Trusted_To_Critical( ), and the Critical_To_Trusted( ) (step S116: NO), the process is transferred to step S118 of FIG. 19, and its read instruction is executed. In step S119, whether the instruction is an instruction for accessing the main memory 4 or not is judged, and if the instruction is not the instruction for accessing the main memory 4 (step S119: NO), the instruction is executed, the next instruction is read in step S102, and transferred to the next instruction.

When it is judged that the instruction is an instruction for accessing the main memory in step S119 (step S119: YES), whether the access destination exists in the main memory or not is checked in step S120. If it is judged that the access destination exists in the main memory in step S120 (step S120: YES), the instruction is executed, and transferred to next instruction (step S102). If it is judged that there is no access destination in the main memory in step S120 (step S120: NO), the process is transferred to step S121, the page fault exception is generated, and the Page_Fault( ) is called. After the calling, the process is transferred to the next instruction (step S102).

Incidentally, Linux has been described as an example so far. However, it is clear that the present invention can be applied to the entire system for managing at the other process unit.

In addition, in the case of inhibiting the normal state, and the case where a state except the above-mentioned three may be added, and the management is executed to improve the reliability, it is clear that the present invention can be applied.

Further, regarding a method for checking the signature, not only demand paging, but also in combination with a method for checking the entire file before the execution, it is clear that the integrity of the process can be checked.

What is claimed is:

1. A computer apparatus for managing and executing a program in a process unit according to an operating system, comprising:

process state judging means for judging whether the state of a process is in the state that at least the integrity of each execution file and each library for using in the process is held or not; and process executing means for executing a process based on a judged result by the process state judging means, wherein the process state judging means judges the integrity of each execution file and each library during the process and based on a reading unit having a fixed predetermined size so that a file falsified during the process is detected.

2. The computer apparatus according to claim 1, wherein the process state judging means judges whether the state of the process is in the state that the integrity is held or the normal state that the integrity is not guaranteed.

3. The computer apparatus according to claim 1, wherein the process state judging means judges whether the state of the process is in the state that the integrity is held and important data needing protection is handled or in the normal state that the integrity is not guaranteed.

4. The computer apparatus according to claim 1, wherein the process state judging means judges whether the state of the process is in the state that only the integrity is held or in the state that the integrity is held and important data needing protection is handled.

5. The computer apparatus according to claim 1, wherein the process state judging means judges whether the state of the process is in the state that only the integrity is held, in the state that the integrity is held and important data needing protection is handled or in the normal state that the integrity is not guaranteed.

6. The computer apparatus according to claim 1, wherein the process executing means executes the process based on the judged result by the process state judging means for the program or data read in a main memory.

7. The computer apparatus according to claim 6, wherein the process executing means executes a decoding process based on the judged result by the process state judging means for the program or data read in the main memory.

8. The computer apparatus according to claim 1, further comprising reliability judging means for judging the reliability of program or data read in a main memory in response to a process state judged by the process state judging means, wherein the process executing means executes a process based on the judged result by the reliability judging means.

9. A process controlling method for managing and executing the execution of a program in a process unit comprising:
   a process state judging step of judging whether the state of the process is in the state that at least the integrity of each execution file and each library for using in the process is held or not; and
   a process executing step of executing the process based on the judged result by the process state judging step,
   wherein the process state judging step judges the integrity of each execution file and each library during the process and based on a reading unit having a fixed predetermined size so that a file falsified during the process is detected.

10. The process controlling method according to claim 9, wherein the process state judging step judges whether the state of the process is in the state that the integrity is held or the normal state that the integrity is not guaranteed.

11. The process controlling method according to claim 9, wherein the process state judging step judges whether the state of the process is in the state that the integrity is held and important data needing protection is handled or the normal state that the integrity is not guaranteed.

12. The process controlling method according to claim 9, wherein the process state judging step judges whether the state of the process is in the state that only the integrity is held or in the state that the integrity is held and important data needing protection is handled.

13. The process controlling method according to claim 9, wherein the process state judging step judges whether the state of the process is in the state that only the integrity is held, in the state that the integrity is held and important data needing protection is handled or in the normal state that the integrity is not guaranteed.

14. The process controlling method according to claim 9, wherein the process executing step executes the process based on the judged result in the process state judging step for the program or data read in a main memory.

15. The process controlling method according to claim 14, wherein the process executing step executes a decoding process based on the judged result by the process state judging step for the program or data read in the main memory.

16. The process controlling method according to claim 9, further comprising reliability judging step for judging the reliability of program or data read in the main memory in response to a process state judged by the process state judging step, wherein the process executing step executes a process based on the judged result by the reliability judging step.

\* \* \* \* \*